Aug. 6, 1968  PAUL T. CHANG ET AL  3,395,960
LIGHT MODULATOR
Filed May 28, 1964

INVENTORS
PAUL T. CHANG
KURT M. KOSANKE

BY David N. Koffsky
ATTORNEY

United States Patent Office 3,395,960
Patented Aug. 6, 1968

3,395,960
LIGHT MODULATOR
Paul T. Chang, Poughkeepsie, and Kurt M. Kosanke, Wappingers Falls, N.Y., assignors to International Business Machines Corporation, New York, N.Y., a corporation of New York
Filed May 28, 1964, Ser. No. 370,932
6 Claims. (Cl. 350—150)

ABSTRACT OF THE DISCLOSURE

Light modulator apparatus acts on linearly polarized light to reflect one component and to selectively alter the polarization of a second component which is transmitted through the apparatus. A birefringent electro-optical crystal is responsive to electrical signals applied across it to alter the polarization. Full reflective mirror means are positioned to reflect the second component back through the birefringent crystal for further polarization alteration. Dependent on the applied electrical signals the two components combine and destructively interfere with one another.

---

This invention relates to light modulation systems and more particularly to a light modulation system incorporating electro-optic techniques.

The laser, which produces a beam of coherent, collimated, plane polarized, monochromatic light has extended the scope of useful electromagnetic radiation into the optical range. Information handling techniques which utilize such light radiation sources have the potential of increasing data handling rates by several orders of magnitude over even the advanced nanosecond computer technologies. The need for useful systems which are able to modulate light beams with desired information signals is obvious.

Light modulating devices are known in the prior art. Many of the more modern light modulators use the phenomenon of interference to create the desired changes of light intensity. Difficulties arise when using such interference modulators due to the fact that atmospheric variations cause small changes in dimensions which require that the devices be continually recalibrated. Additionally, such devices must be carefully mounted to prevent mechanical vibrations from affecting their operation or alignment.

Accordingly, it is an object of this invention to provide an improved light modulator which utilizes interference techniques.

It is another object of this invention to provide an interference light modulator whose operation is independent of mechanical vibrations.

Still another object of this invention is to provide a monolithic interference light modulator whose dimensional alignments are permanently fixed but which may be electrically calibrated.

And yet another object of this invention is to provide a monolithic interference light modulator which is extremely rugged and inexpensive to construct.

In accordance with the above-stated objects, an interference light modulator is provided for modulating the output from a source of monochromatic, linearly polarized light. The modulator includes means for splitting the light beam into a plurality of component beams and electro-optic means for selectively altering the polarization direction of at least one of the component beams in response to discrete electrical signals. The modulator includes further means for effecting recombination of the component beams to cause the beams to destructively interfere with each other when certain discrete electrical signals are applied to the electro-optic means.

The foregoing and other objects, features and advantages of the invention will be apparent from the following more particular description of preferred embodiments of the invention, as illustrated in the accompanying drawings.

Figure 1:
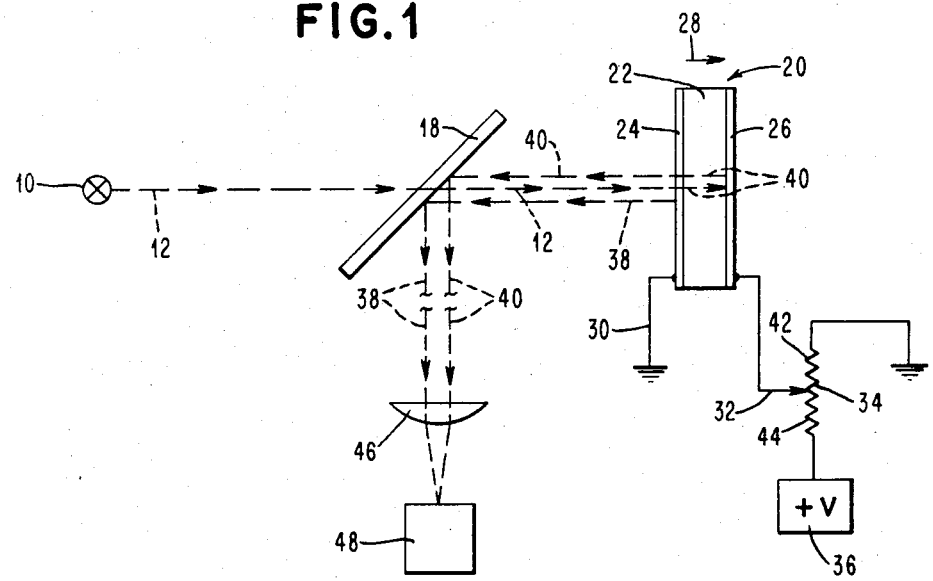
Figure 2:
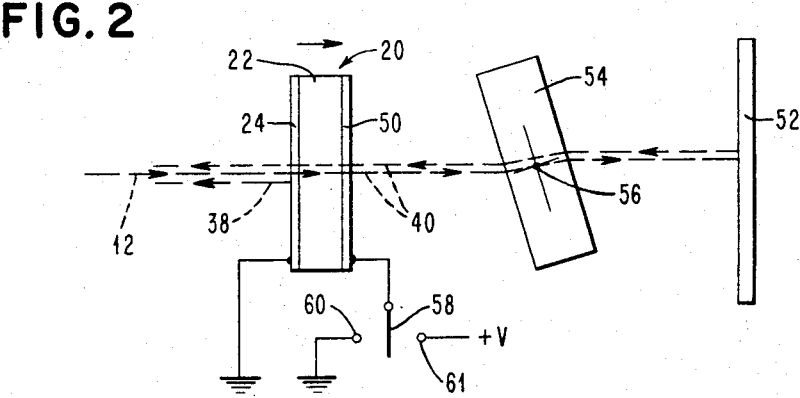
Figure 3:
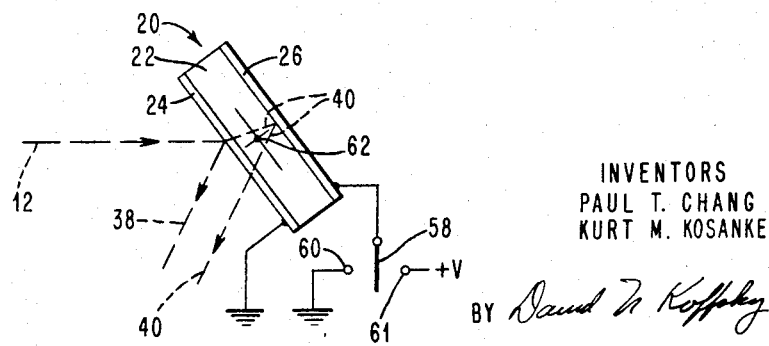

In the drawings:
FIG. 1 is an embodiment of an interference modulation system in accordance with the invention.
FIG. 2 is an embodiment of the invention provided with optical path length adjusting means.
FIG. 3 is yet another means for providing an adjustable optical path length for a component beam.

Referring now to FIG. 1, light source 10 provides collimated beam 12 of plane polarized, monochromatic light. While the most suitable source for such a light beam is a laser, any light source capable of producing such a beam is suitable.

Plane polarized light beam 12 is directed at semitransparent mirror 18. A substantial portion of linearly polarized light beam 12 is passed by semitransparent mirror 18 and continues on to interference modulating element 20.

Interference modulating element 20 includes a uniaxial birefringent electro-optic crystal 22 positioned between a semireflective conductive electrode 24 and a fully reflective conductive electrode 26. The X and Y crystallographic axes of crystal 22 lie in a plane which is parallel to the planes of electrodes 24 and 26. The X' and Y' axes of induced birefringence lie in the same plane with the crystallographic axes but are rotated at 45° therefrom. The optic axis of crystal 22 is oriented in a direction parallel to the transmission path of light beam 12 (as indicated by arrow 28).

Semireflective conductive electrode 24 is connected via conductor 30 to a source of common potential, and fully reflective conductive electrode 26 is connected via movable contact 32 to potentiometer 34. One end of potentiometer 34 is connected to a source of common potential while its other end is connected to high voltage power supply 36. By changing the position of potentiometer contact 32, the potential appearing across crystal 22 may be made to vary.

Crystal 22 is chosen from any one of a number of light transmitting crystals which exhibit electro-optic properties. One such crystal is $KD_2PO_4(KD*P)$. Others which are also suitable are $KH_2PO_4(KDP)$; $NH_4H_2PO_4(ADP)$; $CuCl$; $N_4H_{12}C_6(HMTA)$.

As is well known, the indices of refraction of a birefringent electro-optic crystal may be varied by changing the potential applied across the crystal. If no voltage is applied and a plane polarized light beam is caused to enter the crystal in a path parallel to its optic axis, the components of the light beam lying along the axes of induced birefringence are observed to travel at identical velocities, indicating that the index of refraction for both components is identical. However, if a potential difference is placed across the crystal, the indices of refraction change in such a manner so as to respectively advance and retard the speed of propagation of the light beam components through the crystal.

Any linearly polarized light beam entering electro-optic crystal 22 is resolved into two orthogonal components. If the polarization direction of the light beam falls along either the X or Y crystallographic axis, the light beam is resolved into two equal intensity components along the X' and Y' axes of induced birefringence. Assuming first that no voltage is applied across the crystal, the two equal intensity components travel through the crystal at identical speeds and recombine upon emerging from the crystal with the same respective phase relations. However, when a voltage is applied across crystal 22, one component is delayed with respect to the other. This results in a phase shift between the light beam components. Thus, when they recombine upon emerging from the crystal, a changed polarization status results. With these facts in mind, the operation of electro-optic modulator 20 will now be described.

When light beam 12 impinges upon semireflective conductive electrode 24, it is split into two beams 38 and 40, of approximately equal intensity. Beam 38 is reflected while beam 40 is passed and allowed to enter electro-optic crystal 22. If contact 32 is positioned so that there is no resultant potential across crystal 22, light beam 40 is resolved into its two orthogonal components upon entering electro-optic crystal 22. Assuming that the polarization direction of light beam 40 is vertical and is coincident with the X crystallographic axis, its components along the X' and Y' axes of induced birefringence are of equal intensity. These components travel at equal speeds through electro-optic crystal 22 until they reach fully reflective electrode 26 where they are reflected back towards semireflective electrode 24. Upon reaching the semireflective electrode 24, the orthogonal components of component light wave 40 resolve back into the original polarization direction and recombine with component light wave 38. If the distance traveled by component light wave 40 through electro-optic crystal 22 is an even number of half wave lengths, light waves 38 and 40 additively combine and reinforce each other at semireflective electrode 24. If, on the other hand, the distance traveled by light wave 40 in electro-optic crystal 22 differs from an even number of half wave lengths, there is some destructive interference between the component light waves. If the phase of exiting component light wave 40 differs by 180° from light wave 38, there is complete destructive interference.

To cause component light beams 38 and 40 to destructively interfere with each other, contact 32 is moved to a point (e.g., 44) on potentiometer 34 so that a predetermined potential is applied across crystal 22. This potential is chosen to cause the direction of polarization of component light beam 40 to be rotated 180° from the direction of polarization of component light beam 38 so that destructive interference occurs upon recombination at semireflective electrode 24. In other words, component light beam 40 is phase shifted by an odd number of half wave lengths as it traverses crystal 22. Thus, when it recombines with component light beam 38, it is fully subtractive therefrom and results in a dark pattern on electrode 24. A 2 kilovolt potential applied across a crystal of KD*P provides a 180° phase shift to a component light beam having a wave length of 6328 A.

To assure additive reinforcement between component light beams 38 and 40, a small vernier potential is applied across crystal 22 by placing contact 32 at point 42 on potentiometer 34. This assures that the phase shift of component light beam 40 through crystal 22 is an even number of half wave lengths. It is necessary to apply such a vernier potential to the modulator because the exact distance between electrodes 24 and 26 cannot be controlled sufficiently accurately to physically assure an even number of wave lengths.

Using this technique, it can thus be seen that light beam 12 can be modulated with any type of digital data at a speed which is only limited by the speed of the circuitry which applies the controlling potentials across electrodes 24 and 26. Additionally, the interference modulator 20 is a monolithic physical structure which is rugged, simple to manufacture and impervious to mechanical vibrations. It should be realized that potentiometer 34 and contact 32 are shown merely for the purpose of explaining the operation of interference modulator 20 and that in practice complex electronic circuitry is utilized to provide the modulating voltages.

While the operation of modulator 20 has been described with respect to a light beam 12 having a polarization direction parallel to one of the crystallographic axes, a light beam having a direction of polarization along one of the axes of induced birefringence is also modulated but in a different manner. Instead of being resolved into components, the phase of component beam 40 is changed relative to component beam 38 so as to accomplish the interference pattern when it recombines at electrode 24.

Once component light beams 38 and 40 recombine and exit from interference modulator 20, they are directed back towards semitransparent mirror 18 which then directs them at lens 46. The distance between semitransparent mirror 18 and lens 46 is dependent only upon the desired propagation distance of combined light beams 38 and 40. Assuming that such a data transmission system is used in outer space, the distance may be hundreds of thousands of miles. Lens 46 focuses the light beam onto photo multiplier 48 which converts the modulated light into corresponding electrical signals which may then be utilized in any known manner.

Referring now to FIG. 2, a modification of electro-optic modulator 20 is shown wherein the vernier adjusting voltage is unneeded. In this case, a transparent conductive electrode 50 replaces fully reflective electrode 26 on electro-optic crystal 22, and mirror 52 is provided to reflect component light beam 40. A glass plate 54 is mounted on pivot 56 and is interposed between electrode 50 and mirror 54 to vary the optical path length (and phase shift) seen by component light beam 40. By rotating glass plate 54 about pivot 56, component light beam 40 may be made to pass through a varying thickness of glass. Since the glass imparts a delay to component light beam 40 which is directly dependent upon the length of the optical path length therethrough, the thicker the glass, the more the delay or phase shift. Thus by adjusting the orientation of glass plate 54, the phase shift seen by component waveform 40 can be accurately adjusted. This, of course, requires only a very slight rotation of glass plate 54 (not the exaggerated rotation shown for illustrative purposes in FIG. 2). By this mechanism, the vernier adjustment point 42 on potentiometer 34 as shown in FIG. 1 need not be provided. Therefore, transparent electrode 50 may be connected by switch 58 to either a source of common potential 60 to cause reinforcement between component light beams 38 and 40 or to contact 61 to which a high potential modulating voltage +V is applied to cause destructive interference between the component light beams.

In FIG. 3, a somewhat simpler version of the modification of FIG. 2 is shown. In this case, interference modulator 20 (of the same type as shown in FIG. 1) is mounted on pivot 62 so that it can be rotated thereabout. This modification provides an identical vernier adjustment to that shown in FIG. 2 with the exception of the fact that component wave form 40 has the length of its optical path varied entirely within the modulator. The result is identical to that shown in FIG. 2 in that the positioning switch 58 on either of contacts 60 or 61 causes respectively reinforcement or destructive interference.

While the invention has been particularly shown and described with reference to preferred embodiments thereof, it will be understood by those skilled in the art that the foregoing and other changes in form and details may be made therein without departing from the spirit and scope of the invention.

We claim:
1. A light modulator for modulating the output from a light source which produces a monochromatic, linearly polarized light beam, the modulator comprising in an aligned cascaded optical path:
   semireflective mirror means for splitting said light beam into a plurality of component beams with only one of said component beams being transmitted through said semireflective mirror means;
   birefringent electro-optic crystal means having an optic axis aligned with said light beam positioned after the semireflective mirror means in the optical path, for selectively altering the polarization direction of said one of said component beams in response to discrete electrical signals; and
   full mirror means positioned for reflecting said one of said component beams back to said semireflective mirror means for effecting recombination of said component beams at said semireflective mirror means to cause said beams to destructively interfere with each other when at least one of said electrical signals is applied to said birefringent electro-optic crystal means.

2. An electro-optic light modulator for modulating the output from a light source which produces a monochromatic, linearly polarized light beam, the modulator being a monolithic structure which comprises:
   a semireflective mirror electrode for splitting said light beam into a passed first component beam and a reflected second component beam;
   a birefringent electro-optic crystal abutting said semitransparent electrode and having its optic axis aligned with said light beam;
   a fully reflecting mirror electrode oppositely disposed from said semitransparent mirror electrode and abutting said birefringent crystal; and
   information signal input means connected across said electrodes for applying a signal to cause said birefringent electro-optic crystal to effect a rotation of the polarization direction of said passed first component beam so that the reflection of said first component beam by said reflecting mirror electrode to said semitransparent mirror electrode results in said first and second beams destructively interfering with each other.

3. The invention as defined in claim 2 further including means for rotating said modulator on an axis perpendicular with respect to said light beam for adjusting the optical path length experienced by said first component beam.

4. A light modulator for modulating the output from a light source which produces a monochromatic, linearly polarized light beam, the modulator comprising in an aligned cascaded optical path:
   semireflective mirror means for splitting said light beam into first and second component beams; the first component being transmitted through the mirror means and the second component being reflected by the mirror means;
   birefringent electro-optic means positioned to accept the transmitted first component for selectively altering its polarization direction in response to discrete electrical signals applied thereacross; and
   means for effecting recombination of said first and second component beams at said semireflective mirror means, said means including vernier optical path length adjusting means and a fully reflective mirror, said adjusting means and said fully reflective mirror being positioned after the semireflective mirror means in the optical path for acting on the transmitted first component causing said two beams to destructively interfere with each other when at least one of said electrical signals is applied to said electro-optic means.

5. The invention as defined in claim 4 wherein said vernier optical path length adjusting means is rotatable on an axis perpendicular to the path of said light beam so as to alter the optic path length of said first component beam to assure destructive interference of said two beams when said one electrical signal is applied.

6. A light modulator for modulating the output from a light source which produces a monochromatic, plane polarized light beam, the modulator comprising in optically aligned cascaded relationship:
   a semitransparent mirror electrode for splitting said light beam into first and second component beams;
   a transparent electrode;
   a birefringent electro-optic crystal disposed between said electrodes, for selectively altering the polarization direction of the first of said component beams in response to discrete electrical signals applied across said electrodes;
   a fully reflecting mirror for reflecting said first component beam back towards said semitransparent mirror electrode; and
   a glass plate disposed between said fully reflecting mirror and said transparent electrode and movable on an axis perpendicular to the path of the first component light beam for adjusting the optical path length seen by said first component beam.

References Cited

UNITED STATES PATENTS 2,385,086    9/1945    D'Agostino et al.
3,302,027    1/1967    Fried et al.

FOREIGN PATENTS 342,219    1/1931    Great Britain.

DAVID SCHONBERG, *Primary Examiner.*

P. R. MILLER, *Assistant Examiner.*